Patented Oct. 29, 1929

1,733,564

UNITED STATES PATENT OFFICE

JOHN E. THOMAS, OF CHICAGO, ILLINOIS, ASSIGNOR TO THE CHICAGO WHITE LEAD AND OIL CO., OF CHICAGO, ILLINOIS, A CORPORATION OF ILLINOIS

PROTECTIVE COATING

No Drawing.   Application filed January 20, 1926.   Serial No. 82,614.

This invention relates to a protective coating which, when applied over mahogany or other red aniline dye stains, prevents to a very great extent their fading on exposure to light.

It is well known that the ordinary red stains that are applied to woodwork are not at all fast to light. Upon continued exposure to the action of light, they fade out to a brownish shade.

It is therefore an object of this invention to provide an inexpensive protective coating that may be readily applied over certain stains without materially altering the natural color of the stains and which, when so applied will substantially prevent the stains from fading under the action of light.

Other and further important objects of this invention will be apparent from the disclosures in the specification and appended claims.

I have found that a preparation of various pigments, such as paranitraniline red, lithol red, toluidine red, madder lake, and others, suspended in a suitable vehicle possesses the property of rendering red aniline dye stains fast to light, when applied as a protective coating over such stains. These pigments all have the one common characteristic—a tendency to darken on exposure to light. Just what reaction, if any, occurs between the stain and the pigments of the protective coating is not certain. Perhaps the pigments have the property of absorbing those light rays that cause the fading effect.

The protective coating is prepared by grinding or mixing any one, or a combination of two or more, of the pigments named into a spirit varnish. This varnish is suitably prepared by dissolving gum shellac, Pontianak, East India, sandarac, Manila or other gum in so called "spirits", by which is meant alcohol or methylated spirits. Such a spirit varnish is suitable for use over oil stains; but where the stain is either a water or spirit stain, an oil varnish containing the protective pigments may preferably be applied. The reason for this is that oil stains penetrate an oil varnish coating to give an unpleasant mottled effect, so they require a spirit varnish finish. But over a water or spirit stain, which will not bleed, any of the oil varnishes into which the protective pigment has been ground or mixed is preferable.

I have found that a preparation containing not less than 1/8 of an ounce of paranitraniline red, lithol red, toluidine red, madder lake, or other pigment of similar character in one gallon of spirit shellac comprised of any of the above gums, or in one gallon of an oil varnish, produces an effectual protective coating. It is obvious that the proportion of pigment to shellac or varnish may be increased up to a maximum quantity determined in part by the consistency of the mixture of shellac or varnish and pigment. This maximum is approximately 2 pounds of pigment to a gallon of the vehicle. In general, as the percentage of pigment in the vehicle is increased, the effectiveness of the protective coating is also increased, but only up to a certain point.

In actual tests made by exposing blocks of wood stained with a mahogany aniline dye to the fading action of artificial light, it was found that when the stain was covered with my protective coating, no appreciable fading was noticeable after ten hours of exposure, the equivalent of two years' exposure under natural conditions. Whereas during the same length of exposure, a sample of uncoated stain faded to a light brown. It is therefore apparent that my protective coating is of great value in substantially preventing mahogany and red aniline stains from fading out from continued exposure to the light.

My protective composition possesses the great advantage that it may be applied over a stained surface by simply brushing it on in the same way as any varnish or shellac. When so applied, the protective coating does not noticeably alter the natural color of the stain, but, on the contrary, preserves the stain in its original color against the continued action of sunlight for an indefinite period.

I am aware that many changes may be made and numerous details of the process may be varied through a wide range without departing from the principles of this invention and I therefore do not purpose limiting the patent granted hereon otherwise than necessitated by the prior art.

I claim as my invention:

1. An article having a base coating of a red aniline dye stain and a protective coating formed thereover comprising a varnish vehicle and an organic pigment selected from a group of pigments consisting of paranitraniline red, litho red, toluidine red and madder lake in a quantity sufficient to prevent fading of the red aniline stain and insufficient to appreciably alter the color of the stain.

2. An article having a base coating of a red aniline dye stain and a protective coating formed thereover comprising a varnish vehicle and paranitraniline red in a quantity sufficient to prevent fading of the red aniline stain and insufficient to appreciably alter the color of the stain.

In testimony whereof I have hereunto subscribed my name.

JOHN E. THOMAS.